April 5, 1960 R. M. STRASSNER 2,931,566
APPARATUS FOR READING THE AMPLITUDE OF VISIBLY RECORDED CURVES
Filed Dec. 20, 1954 3 Sheets-Sheet 1

INVENTOR.
ROBERT M. STRASSNER
BY
Christie, Parker & Hale
ATTORNEYS

April 5, 1960  R. M. STRASSNER  2,931,566
APPARATUS FOR READING THE AMPLITUDE OF VISIBLY RECORDED CURVES
Filed Dec. 20, 1954  3 Sheets-Sheet 2

INVENTOR.
ROBERT M. STRASSNER
BY
Christie, Parker & Hale
ATTORNEYS

April 5, 1960    R. M. STRASSNER    2,931,566
APPARATUS FOR READING THE AMPLITUDE OF VISIBLY RECORDED CURVES
Filed Dec. 20, 1954    3 Sheets-Sheet 3

FIG. 4.

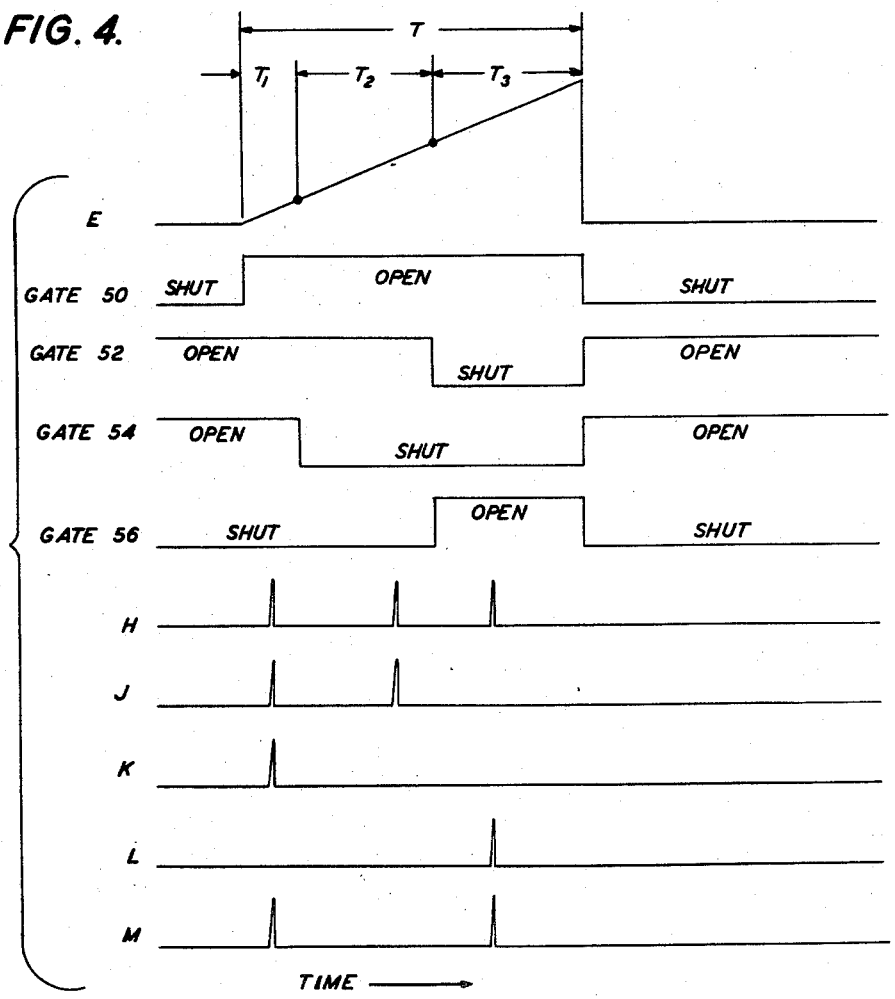

T = TIME WIDTH OF SAWTOOTH WAVE OR OF OSCILLOGRAPH RECORD $T_1$ = TIME WIDTH OF PORTION OF RECORD RESERVED FOR REFERENCE LINE $T_2$ = TIME WIDTH OF PORTION OF RECORD RESERVED FOR FIRST DATA TRACE $T_3$ = TIME WIDTH OF PORTION OF RECORD RESERVED FOR SECOND DATA TRACE

INVENTOR.
ROBERT M. STRASSNER
BY
Christie, Parker & Hale
ATTORNEYS

United States Patent Office 2,931,566
Patented Apr. 5, 1960

2,931,566

APPARATUS FOR READING THE AMPLITUDE OF VISIBLY RECORDED CURVES

Robert M. Strassner, Redwood City, Calif., assignor, by mesne assignments, to Consolidated Electrodynamics Corporation, Pasadena, Calif., a corporation of California Application December 20, 1954, Serial No. 476,401

2 Claims. (Cl. 235—61.6)

This invention relates to the field of data processing, and has particular reference to the apparatus for evaluating the amplitudes of visibly recorded curves at successive points along the curves, such as on oscillograph records and the like.

An oscillograph record ordinarily comprises an elongated sheet of more or less translucent material along the length of which relatively opaque lines appear, namely one or more wavy data traces or curves and suitable marks representing time intervals along the record. In some cases, a substantially straight reference line also appears along the length of the record; and in other cases, a reference line or its equivalent may be provided external to the record. Such a record is commonly wound onto spools, which are separated to expose a portion of the length of the record, and is driven at constant speed by means of a motor.

At the present time, the fastest accurate method of converting the data traces to digital data is by the use of some type of manually operated reading device. Such a device commonly utilizes cross hairs which are manually centered on points along a data trace. Knobs which adjust the position of the cross hairs also turn potentiometers which produce voltages proportional to the digital value of the trace at the points. The voltages are digitized by conventional means. Thus, for example, a conversion is first made from space to voltage and thence to digital contact closures; and the manual operation associated therewith makes the process time-consuming and tedious.

The present invention solves the basic problem by providing a rapid automatic means for producing electrical signals defining time intervals representative of the amplitude of the data trace at successive points along the record, in combination with converter means for providing a digital representation in accordance with said time intervals. An operator is required only for the initial set up and monitoring of the apparatus.

A preferred embodiment of the invention is described with reference to the drawings, in which:

Fig. 4 is a wave diagram showing qualitatively a magnified set of waveforms which correspond by letter designation to the gating circuits of Fig. 1.

Figure 1:
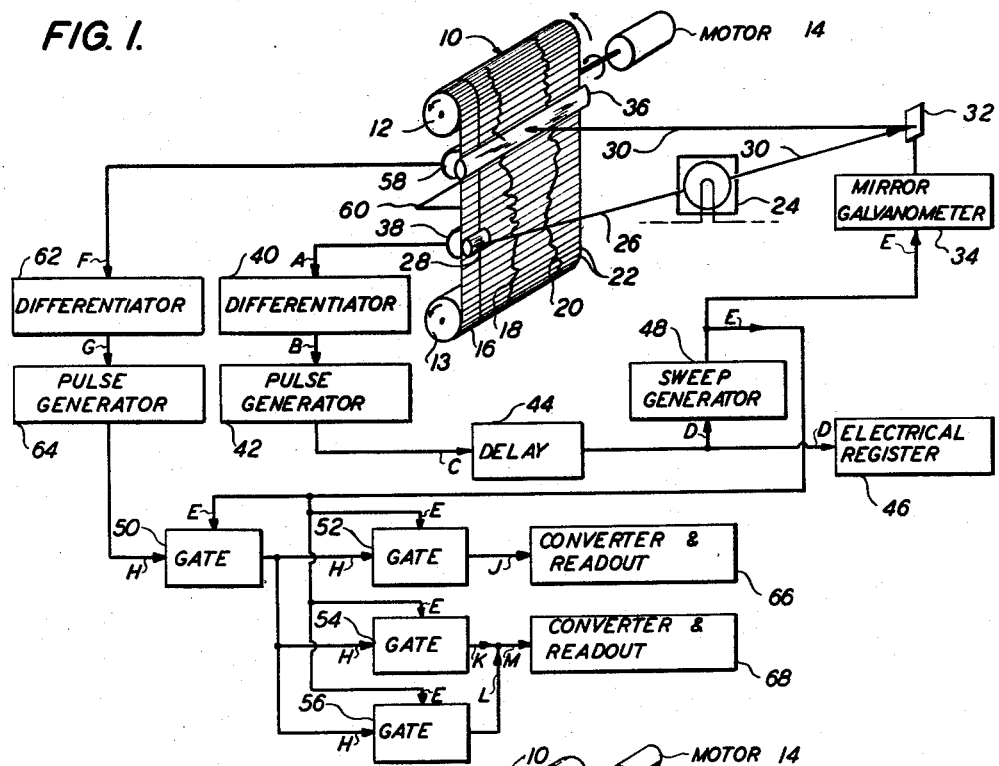
Fig. 1 is a schematic drawing showing the curve reader of the invention set up to accommodate an oscillograph record having two data traces.

With reference to Fig. 1 of the drawings, an oscillograph record 10 is rolled onto two spools 12 and 13 which are spaced apart to expose a portion of the length of the record. The spools are driven by a motor 14, preferably in some conventional fashion which causes the record to move at constant speed. Relatively opaque lines, comprising a reference line 16, a first data trace 18, a second data trace 20, and a series of spaced timing marks 22, appear on the record. Alternatively, the reference line could be a reference marker such as a wire located adjacent the record. The reference line and the data traces are confined to separate portions of the width of the record. A shielded light source 24 directs a first light beam 26 onto a small lens 28 located near one edge of the record which in turn focuses the beam to a point on the record. The light source also directs a second light beam 30 onto the mirror 32 of a mirror galvanometer 34. The galvanometer mirror reflects the light beam onto an elongated lens 36 disposed transversely of the record, which focuses the light beam to a point on the record.

A first photocell 38, sensitive to interruptions by the timing marks of the transmission through the record of the point of light formed from the first light beam 26, is disposed opposite the small lens 28 and adjacent the opposite side of the record therefrom. Electrical signals A from the first photocell 38 correspond to successive interruptions by the timing marks in the transmission of the first light beam 26 through the record. These signals A are differentiated by a first differentiator 40, resulting in differentiated signals B which drive a first pulse generator 42. The first pulse generator, in turn, generates sharp pulses C in accordance with the differentiated signals and feeds these pulses into a delay circuit 44. This results in delayed pulses D which are applied to an electrical register 46 and a sweep generator 48. The electrical register accumulates a count of the pulses D to provide a running measure of the time abscissa traversed along the record. The sweep generator is triggered by the pulses D to produce saw-toothed waves E which are fed to the mirror galvanometer causing it to sweep the reflected portion of the second light beam 30 transversely across the record at a fast, substantially constant speed. Thus, the sweep of the reflected portion of the second light beam 30 is controlled by the successive interruptions by the timing marks of the transmission of the first light beam 26 through the record.

The sweep generator also applies the saw-tooth waves E to gates 50, 52, 54 and 56, causing them to open and close in the manner depicted in Fig. 4.

A second photocell 58, sensitive to interruptions by the two data traces and the reference line of the transmission through the record of the point of second light formed from the light beam 30, is disposed opposite the elongated lens 36 adjacent the opposite side of the record therefrom and is separated from the first photocell 38 by an opaque light shield 60. Electrical signals F from the second photocell 58 have a time spacing between them which is representative of the distances between the reference line and the data traces. These signals F are applied to a second differentiator 62, resulting in differentiated signals G, which are in turn applied to a second pulse generator 64. This results in sharp pulses H from the second pulse generator. These pulses H are applied to a first gate 50, which is coupled to the sweep generator and is opened by and during the continuance of each saw-tooth pulse E, that is, open only when the reflected portion of the second beam of light 30 is in the process of sweeping from left to right. The pulses H passed by the first gate when it is open are applied to each of three additional gates, namely a second gate 52, third gate 54, and fourth gate 56. These gates are coupled to the sweep generator and are operated by the saw-tooth pulse E, which causes them to open and close at preset voltages. The second gate 52 is normally open but closes when the rising voltage from the saw-tooth pulse obtains a value corresponding to the reflected portion of the second light beam 30 having swept over the portions of the width of the record reserved for the base line and first trace. Thus, the second gate 52 passes only two pulses J, corresponding to the mentioned interruptions in light transmission by the reference line and the first data trace. The pulses J passed by the second gate are applied to conventional electronic converter and readout means 66 which converts the time spacing between the pulses to a digital representation of the ordinate of the first data trace as determined by the distance between the reference line and the first data trace. The other two gates 54 and 56 operate similarly and, as shown in Fig. 4, the third gate 54 passes only the pulse K corresponding to the interruption in light transmission by the reference line, and the fourth gate 56 passes only the pulse L corresponding to the interruption in light transmission by the second data trace. The outputs of the third and fourth gates, 54 and 56, are coupled together; thus, a pair of pulses M are applied to a conventional electronic converter and readout means 68, which converts the time spacing or interval between the pulses to a digital representation of the ordinate of the second data trace as determined by the distance between the reference line and the second data trace. A conventional converter and read-out means suitable for use with the present apparatus is disclosed in U.S. Patent No. 2,566,078, issued August 28, 1951, to W. H. Bliss.

By extending the number of gating circuits, oscillograph records having more than two data traces can be accommodated.

Figure 2:
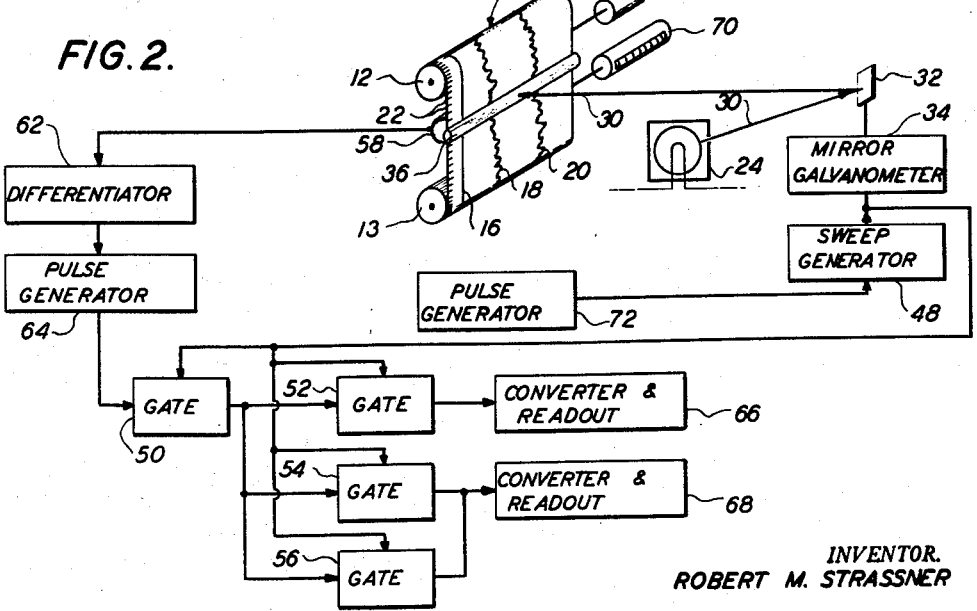
Fig. 2 is the same as Fig. 1 except that it shows an alternate means for controlling the reading frequency of the curve reader of the invention and alternate means for registering the abscissa position along the record.
Figure 3:
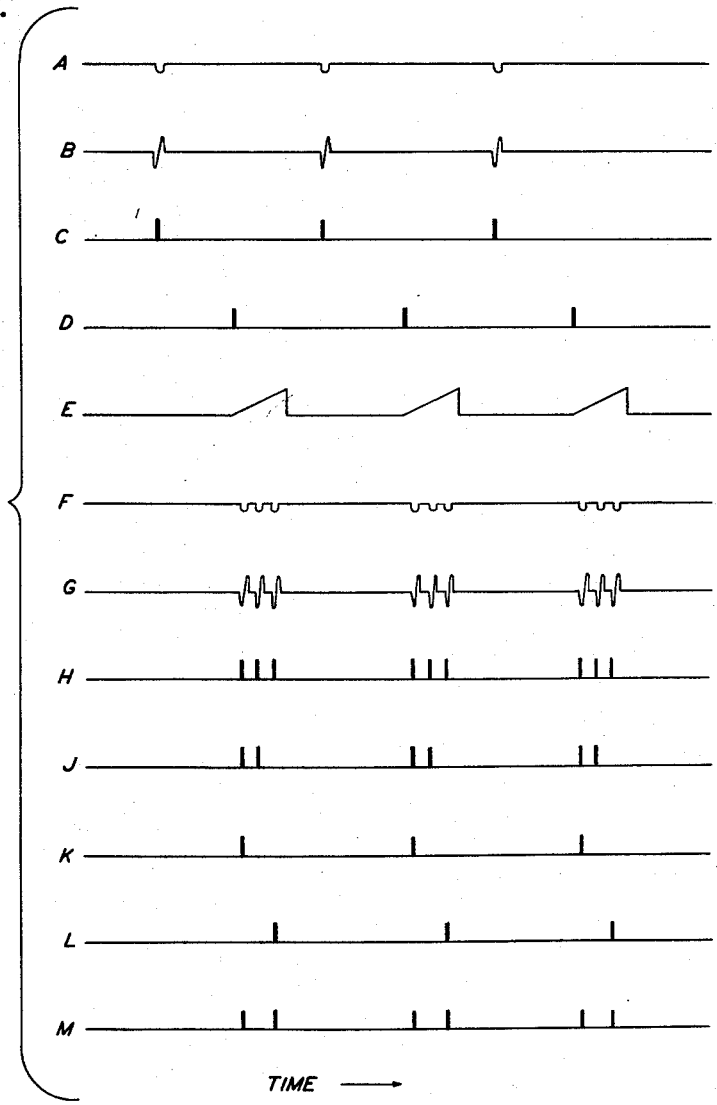
Fig. 3 is a wave diagram showing qualitatively the waveforms produced in the corresponding circuitry of Fig. 1, the correspondence between the waveforms and the circuits being designated by letters of the alphabet.

Fig. 2 shows the same arrangement as does Fig. 1, except that the electrical register has been replaced with a mechanical register 70 which serves to keep a running measure of abscissa traversed along the length of the record, the timing marks 22 are foreshortened to keep the swept or reflected portion of the second beam of light 30 from crossing them, and the combination of the first light beam 26, the small lens 28, the first photocell 38, the first differentiator 40, the first pulse generator 42, and the delay circuit 44, has been replaced by a free running pulse generator 72, which now triggers the sweep generator with evenly spaced pulses that it produces at an adjustable rate. This is a less expensive arrangement.

I claim:

1. In apparatus for evaluating the amplitude of a data trace visibly recorded along the length of an oscillograph record or the like, the record also having timing marks visibly recorded on it, the combination which comprises means defining a substantially straight visible line extending alongside the data trace for providing a reference from which amplitude measurements may be taken, means for moving the record longitudinally, means for sweeping a point of light transversely across the record at successive intervals, means for directing a fixed point of light on to the record, photoelectric means responsive to interceptions of the fixed point of light by the timing marks for controlling said intervals when the swept point of light is swept across the record, photoelectric means responsive to successive interceptions of the reference line and the data trace by the swept point of light for producing electrical signals defining successive time intervals, which time intervals represent the time taken on each successive sweep by the point of light to intercept the data trace after intercepting the reference line, and means responsive to said electrical signals for converting said time intervals successively to digital indications of amplitude.

2. In apparatus for evaluating the amplitudes of a plurality of data traces visibly recorded along the length of an oscillograph record or the like, where a separate portion of the width of the record is reserved for each data trace, the combination which comprises means defining a substantially straight visible line extending alongside the data traces for providing a reference from which amplitude measurements may be taken, means for moving the record longitudinally, means for sweeping a point of light transversely across the record at successive intervals, photoelectric means responsive to successive interceptions of the reference line and the data traces by the swept point of light for producing electrical signals defining time intervals, which time intervals represent the time taken by the swept point of light to intercept the respective data traces after intercepting the reference line for each sweep of the point of light, gating means for separating the signals defining the time interval corresponding to interception of the reference line and one data trace from the signals defining the time intervals corresponding to interception of the reference line and the other data traces for each sweep of the point of light, and means responsive to said separated signals for converting said time intervals to digital indications of amplitude for each respective data trace.

References Cited in the file of this patent

UNITED STATES PATENTS

| | | |
|---|---|---|
| 2,393,631 | Harrison et al. | Jan. 29, 1946 |
| 2,447,024 | Metcalf | Aug. 17, 1948 |
| 2,494,441 | Hillier | Jan. 10, 1950 |
| 2,597,866 | Gridley | May 27, 1952 |
| 2,616,965 | Hoeppner | Nov. 4, 1952 |
| 2,634,052 | Bloch | Apr. 7, 1953 |
| 2,674,916 | Smith | Apr. 13, 1954 |
| 2,704,633 | Strother | Mar. 22, 1955 |
| 2,765,211 | Brinster et al. | Oct. 2, 1956 |